United States Patent
Kum et al.

(10) Patent No.: US 10,131,220 B2
(45) Date of Patent: Nov. 20, 2018

(54) MULTI-MODE HYBRID VEHICLE POWERTRAIN APPARATUS

(71) Applicant: Korea Advanced Institute of Science and Technology, Yuseong-gu Daejeon (KR)

(72) Inventors: Dong Suk Kum, Daejeon (KR); Jin Geon Kang, Daejeon (KR); Hyun Jun Kim, Daejeon (KR); Toumadher Barhoumi, Daejeon (KR)

(73) Assignee: KOREA ADVANCED INSTITUTE OF SCIENCE AND TECHNOLOGY, Yuseong-Gu, Daejeon (KR)

(*) Notice: Subject to any disclaimer, the term of this patent is extended or adjusted under 35 U.S.C. 154(b) by 0 days.

(21) Appl. No.: 15/531,383

(22) PCT Filed: Dec. 29, 2016

(86) PCT No.: PCT/KR2016/015492
§ 371 (c)(1),
(2) Date: May 26, 2017

(87) PCT Pub. No.: WO2017/116172
PCT Pub. Date: Jul. 6, 2017

(65) Prior Publication Data
US 2018/0050583 A1 Feb. 22, 2018

(30) Foreign Application Priority Data

Dec. 29, 2015 (KR) .................. 10-2015-0188234

(51) Int. Cl.
*B60K 6/48* (2007.10)
*B60K 6/365* (2007.10)

(52) U.S. Cl.
CPC ............ *B60K 6/365* (2013.01); *B60K 6/48* (2013.01); *B60K 2006/4841* (2013.01)

(58) Field of Classification Search
CPC .......... B60K 6/36; B60K 6/365; B60K 6/383; B60K 6/40; B60K 6/48; B60K 6/4833; B60K 6/4841
See application file for complete search history.

(56) References Cited

U.S. PATENT DOCUMENTS 5,558,173 A * 9/1996 Sherman ............... B60W 20/40
180/53.8
6,093,974 A * 7/2000 Tabata ................... B60K 6/365
180/65.25
(Continued)

FOREIGN PATENT DOCUMENTS

JP       2013199198 A    10/2013
KR      20070084657 A    8/2007
(Continued)

OTHER PUBLICATIONS

International Search Report for International Application No. PCT/KR2016/015492 dated Mar. 22, 2017, 6 pages.
(Continued)

*Primary Examiner* — Erez Gurari
(74) *Attorney, Agent, or Firm* — TraskBritt

(57) ABSTRACT

A hybrid powertrain apparatus comprising a first planetary gear device including at least three rotary elements, a first motor, an output axis, and a second motor connected to a first rotary element, a second rotary element, and a third rotary element of the first planetary gear device; a first brake and a second brake provided to vary rotation restricting states of the first rotary element and the third rotary element relative to a fixing member; an engine variably connected to the first rotary element; a clutch configured to variably connect the first rotary element and the engine to vary a mutual rotation restricting state between the first rotary element and the engine; and a speed multiplication gear or
(Continued)

a speed reduction gear between the clutch and the engine and connecting the clutch and the engine.

8 Claims, 25 Drawing Sheets

(56) References Cited

U.S. PATENT DOCUMENTS

| | | | | |
|---|---|---|---|---|
| 7,220,202 B2* | 5/2007 | Singh | ............... | B60K 6/365 |
| | | | | 475/5 |
| 7,980,980 B2* | 7/2011 | Rask | ............... | B60K 6/445 |
| | | | | 475/5 |
| 8,196,687 B2* | 6/2012 | Swales | ............... | B60K 6/383 |
| | | | | 180/65.245 |
| 2006/0019784 A1* | 1/2006 | Sowul | ............... | B60K 6/365 |
| | | | | 475/5 |
| 2007/0187159 A1* | 8/2007 | Lee | ............... | B60K 6/365 |
| | | | | 180/65.25 |
| 2007/0265128 A1* | 11/2007 | Conlon | ............... | B60K 6/365 |
| | | | | 475/5 |
| 2010/0227722 A1* | 9/2010 | Conlon | ............... | B60K 6/365 |
| | | | | 475/5 |
| 2011/0245034 A1* | 10/2011 | Yoshida | ............... | B60K 6/48 |
| | | | | 477/8 |
| 2015/0283993 A1* | 10/2015 | Takano | ............... | B60K 6/48 |
| | | | | 701/22 |
| 2016/0009273 A1* | 1/2016 | Nagamine | ............... | F16H 61/0031 |
| | | | | 180/65.25 |
| 2016/0137050 A1* | 5/2016 | Nishimine | ............... | B60K 6/445 |
| | | | | 475/2 |
| 2016/0265652 A1* | 9/2016 | Nishimine | ............... | B60K 6/48 |
| 2017/0346412 A1* | 11/2017 | Lei | ............... | B60K 6/365 |
| 2017/0355359 A1* | 12/2017 | Tsukada | ............... | B60W 20/10 |
| 2017/0361696 A1* | 12/2017 | Davydov | ............... | B60K 6/365 |
| 2018/0050583 A1* | 2/2018 | Kum | ............... | B60K 6/365 |
| 2018/0056981 A1* | 3/2018 | Cho | ............... | B60W 20/40 |

FOREIGN PATENT DOCUMENTS

| | | |
|---|---|---|
| KR | 20080096396 | 10/2008 |
| KR | 20100037204 A | 4/2010 |
| KR | 20110119330 A | 11/2011 |
| KR | 101459472 B1 | 11/2014 |
| KR | 101567721 B1 | 11/2015 |

OTHER PUBLICATIONS

International Written Opinion for International Application No. PCT/KR2016/015492 dated Mar. 22, 2017, 6 pages.

* cited by examiner

| Mode | CL | BK1 | BK2 |
|---|---|---|---|
| EV1 (EM A available) | 0 | 0 | 1 |
| EV3 (EM A & B available) | 0 | 0 | 0 |
| Split | 1 | 0 | 0 |
| Parallel | 1 | 0 | 1 |

0 : Clutch disconnected, 1 : Clutch connected

FIG. 2A

| Mode | CL | BK1 | BK2 |
|---|---|---|---|
| EV1 (EM A available) | 0 | 0 | 1 |
| EV2 (EM B available) | 0 | 1 | 0 |
| EV3 (EM A & B available) | 0 | 0 | 0 |
| Split | 1 | 0 | 0 |
| Parallel | 1 | 0 | 1 |

0 : Clutch disconnected, 1 : Clutch connected

FIG. 2B

| Mode | CL1 | CL2 | BK1 |
|---|---|---|---|
| EV1 (EM A available) | 0/1 | 0/1 | 1 |
| EV2 (EM A & B available) | 0 | 1 | 0 |
| Split | 1 | 1 | 0 |
| Series | 1 | 0 | 1 |

0: Clutch disconnected, 1: Clutch connected

FIG. 15

MULTI-MODE HYBRID VEHICLE POWERTRAIN APPARATUS

CROSS-REFERENCE TO RELATED APPLICATIONS

This application is a national phase entry under 35 U.S.C. § 371 of International Patent Application PCT/KR2016/015492, filed Dec. 29, 2016, designating the United States of America, which claims the benefit under Article 8 of the Patent Cooperation Treaty to Korean Patent Application Serial No. 10-2015-0188234, filed Dec. 29, 2015.

TECHNICAL FIELD

The present invention relates to a hybrid powertrain apparatus for a vehicle.

BACKGROUND

A hybrid powertrain apparatus that uses a planetary gear set and two motor generators together with an engine may function as a continuously variable transmission, electrically operated by controlling a speed of the motor generator without a separate transmission. Also, by controlling the speed of the motor generator, the hybrid powertrain apparatus may implement a motor mode, an engine mode, a hybrid mode, and a regenerative braking mode.

In the hybrid powertrain apparatus, an on/off control may be performed on the engine as necessary, which may increase fuel efficiency. Also, use of a frictional brake may be minimized in order to increase regenerative braking efficiency.

A structure widely applied to a hybrid electric vehicle powertrain using two motor generators may be an input split type structure in which one of the two motor generators is fixably connected to an output axis directly.

A powertrain in such structure may provide a maximum efficiency at a transmission ratio forming a mechanical point at which a speed of the other motor generator not connected directly to the output axis. On this basis, when the transmission ratio increases or decreases on this basis, the efficiency may decrease. Also, degradation in the efficiency in a case in which the transmission ratio decreases may be radically increased in comparison to a case in which the transmission ratio increases. That is, as the transmission ratio decreases over the mechanical point, for example, as a difference in speed increases, the efficiency of the powertrain may be radically decreased.

Another structure widely applied to a hybrid electric vehicle powertrain using two motor generators may be a compound split structure in which the two motor generators are not connected directly to an output axis or an input axis but connected to different rotary elements of a planetary gear device.

Korean Patent Application No. 2008-0096396 filed on Oct. 1, 2008 discloses "hybrid power train of vehicle."

BRIEF SUMMARY

Technical Goals

An aspect provides a hybrid powertrain apparatus for arranging and connecting an engine and two motors at an optimal position in a power-split hybrid vehicle, thereby realizing high fuel efficiency and acceleration performance.

Another aspect also provides a vehicular hybrid powertrain apparatus to implement a hybrid mode and an electric vehicle mode using a relatively simple and few elements, thereby increasing a fuel efficiency of a vehicle in a relatively large interval.

Still another aspect also provides a vehicle to be positioned in the middle of a lever or between motors, thereby realizing a two-motor mode and significantly increasing an acceleration performance.

Technical Solutions

According to an aspect, there is provided a hybrid powertrain apparatus including a first planetary gear device including at least three rotary elements, a first motor, an output axis, and a second motor connected to a first rotary element, a second rotary element, and a third rotary element of the first planetary gear device, a first brake provided to vary a rotation restricting state of the first rotary element relative to the fixing member, a second brake provided to vary a rotation restricting state of the third rotary element relative to a fixing member, an engine variably connected to the first rotary element, and a clutch configured to variably connect the first rotary element and the engine so as to vary a mutual rotation restricting state between the first rotary element and the engine. The hybrid powertrain apparatus may further include a speed multiplication gear or a speed reduction gear disposed between the clutch and the engine and connect the clutch and the engine.

The first rotary element, the second rotary element, and the third rotary element of the first planetary gear device may be respectively a first ring gear, a first carrier, and a first sun gear, the first ring gear may be connected to the first motor, the first brake, and the clutch, the first carrier may be connected to the output axis, and the first sun gear may be connected to the second motor and the second brake.

According to another aspect, there is also provided a hybrid powertrain apparatus including a first planetary gear device including at least three rotary elements, a second planetary gear device variably connected to the first planetary gear device and including at least three rotary elements, a first motor, an output axis, and a second motor connected to a first rotary element, a second rotary element, and a third rotary element of the first planetary gear device, a first brake provided to vary a rotation restricting state of the first rotary element relative to the fixing member, a second brake provided to vary a rotation restricting state of the third rotary element relative to a fixing member, and an engine connected to the second planetary gear device.

The hybrid powertrain apparatus may further include a clutch configured to variably connect the first rotary element and the second planetary gear device so as to vary a mutual rotation restricting state between the first rotary element and the second planetary gear device.

A first rotary element of the second planetary gear device may be connected to the engine, a second rotary element of the second planetary gear device may be grounded, and a third rotary element of the second planetary gear device may be variably connected to the first rotary element of the first planetary gear device by the clutch.

The first rotary element, the second rotary element, and the third rotary element of the first planetary gear device may be respectively a first ring gear, a first pinion gear, and a first sun gear, and the first rotary element, the second rotary element, and the third rotary element of the second planetary gear device may be respectively a second ring gear, a second pinion gear, and a second sun gear.

A first rotary element of the second planetary gear device may be grounded, a second rotary element and a third rotary element of the second planetary gear device may be variably connected to the first rotary element of the first planetary gear device, and a fourth rotary element of the second planetary gear device may be connected to the engine.

The first rotary element, the second rotary element, and the third rotary element of the first planetary gear device may be respectively a first ring gear, a first pinion gear, and a first sun gear, and the first rotary element, the second rotary element, the third rotary element, and the fourth rotary element of the second planetary gear device may be respectively a second ring gear, two second pinion gears, and a second sun gear.

A first rotary element of the second planetary gear device may be grounded, a second rotary element and a third rotary element of the second planetary gear device may be connected to the engine, and a fourth rotary element of the second planetary gear device may be variably connected to the first rotary element of the first planetary gear device by the clutch.

The first rotary element, the second rotary element, and the third rotary element of the first planetary gear device may be respectively a first ring gear, a first pinion gear, and a first sun gear, and the first rotary element, the second rotary element, the third rotary element, and the fourth rotary element of the second planetary gear device may be respectively a second ring gear, two second pinion gears, and a second sun gear.

According to another aspect, there is also provided a hybrid powertrain apparatus including a first planetary gear device including at least three rotary elements, a first motor, an output axis, and a second motor connected to a first rotary element, a second rotary element, and a third rotary element of the first planetary gear device, a first brake provided to vary a rotation restricting state of the first rotary element relative to the fixing member, a second brake provided to vary a rotation restricting state of the third rotary element relative to a fixing member, a parallel-axis gear variably connected to the first rotary element, and an engine connected to the parallel-axis gear.

The hybrid powertrain apparatus may further include a clutch configured to variably connect the first rotary element and the parallel-axis gear so as to vary a mutual rotation restricting state between the first rotary element and the parallel-axis gear.

The first rotary element, the second rotary element, and the third rotary element of the first planetary gear device may be respectively a first ring gear, a first pinion gear, and a first sun gear.

According to yet another aspect, there is also provided a hybrid powertrain apparatus including a first planetary gear device including at least three rotary elements, a second motor variably connected to a first rotary element of the first planetary gear device, an output axis and a first motor connected to a second rotary element and a third rotary element of the first planetary gear device, an engine variably connected to the second motor, and a first brake provided to vary a rotation restricting state of the first rotary element relative to a fixing member.

The hybrid powertrain apparatus may further include a first clutch configured to variably connect the engine and the second motor so as to vary a mutual rotation restricting state between the engine and the second motor, and a second clutch configured to variably connect the second motor and the first rotary element so as to vary a mutual rotation restricting state between the second motor and the first rotary element.

The hybrid powertrain apparatus may further include a speed multiplication gear or a speed reduction gear disposed between the first clutch and the engine and connect the first clutch and the engine.

The hybrid powertrain apparatus may further include a parallel-axis gear disposed between the first clutch and the engine to be variably connected to the engine.

Effects

According to an aspect, it is possible to provide a hybrid powertrain apparatus for arranging and connecting an engine and two motors at an optimal position in a power-split hybrid vehicle, thereby realizing high fuel efficiency and acceleration performance.

According to another aspect, it is possible to implement a hybrid mode and an electric vehicle mode using a relatively simple and few elements, thereby increasing a fuel efficiency of a vehicle in a relatively large interval.

According to still another aspect, it is possible to position a vehicle in the middle of a lever or between motors, thereby realizing a 2 motor mode and significantly increasing an acceleration performance.

BRIEF DESCRIPTION OF THE DRAWINGS

FIGS. 2A and 2B illustrate operation statuses of a brake and a clutch for each mode of the hybrid powertrain apparatus of FIG. 1.

FIG. 15 illustrates operation statuses of a brake and a clutch for each mode of the hybrid powertrain apparatus of FIG. 14.

DETAILED DESCRIPTION

Hereinafter, example embodiments will be described with reference to the accompanying drawings. The following description is provided according to some aspects of the example embodiments, and forms part of a detailed description of the example embodiments.

Also, descriptions of functions and constructions that are well known to one of ordinary skill in the art may be omitted for increased clarity and conciseness.

It should be understood that the terms used in the specification and the appended claims should not be construed as limited to general and dictionary meanings, but interpreted based on the meanings and concepts corresponding to technical aspects of a hybrid powertrain apparatus of the disclosure based on the principle that the inventor is allowed to define the terms.

Accordingly, the description proposed herein is merely an example for the purpose of illustration, and is not intended to represent all technical aspects related to the hybrid powertrain apparatus of the disclosure, so it should be understood that other equivalents and modifications could be made thereto without departing from the spirit and scope of the disclosure.

Figure 1:
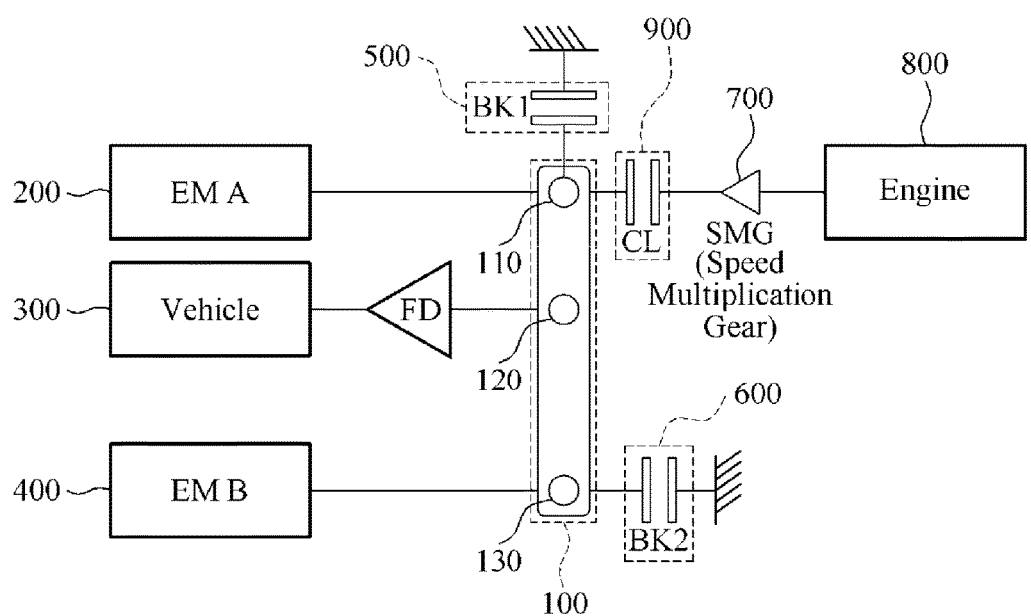
FIG. 1 illustrates a hybrid powertrain apparatus including a speed multiplication gear (SMG).
Figure 3:
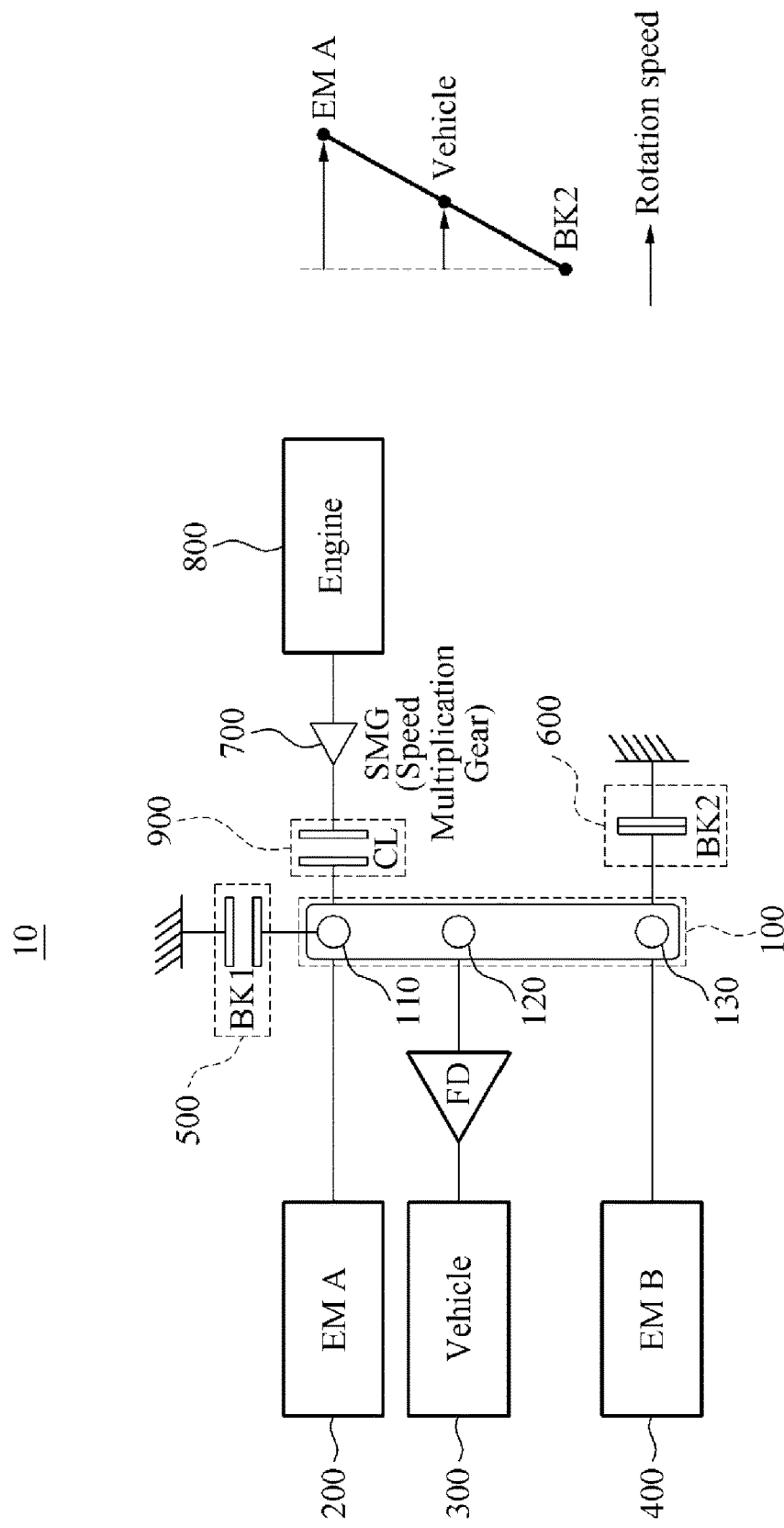
FIG. 3 illustrates an electric vehicle (EV)1 mode of the hybrid powertrain apparatus of FIG. 1.
Figure 4:
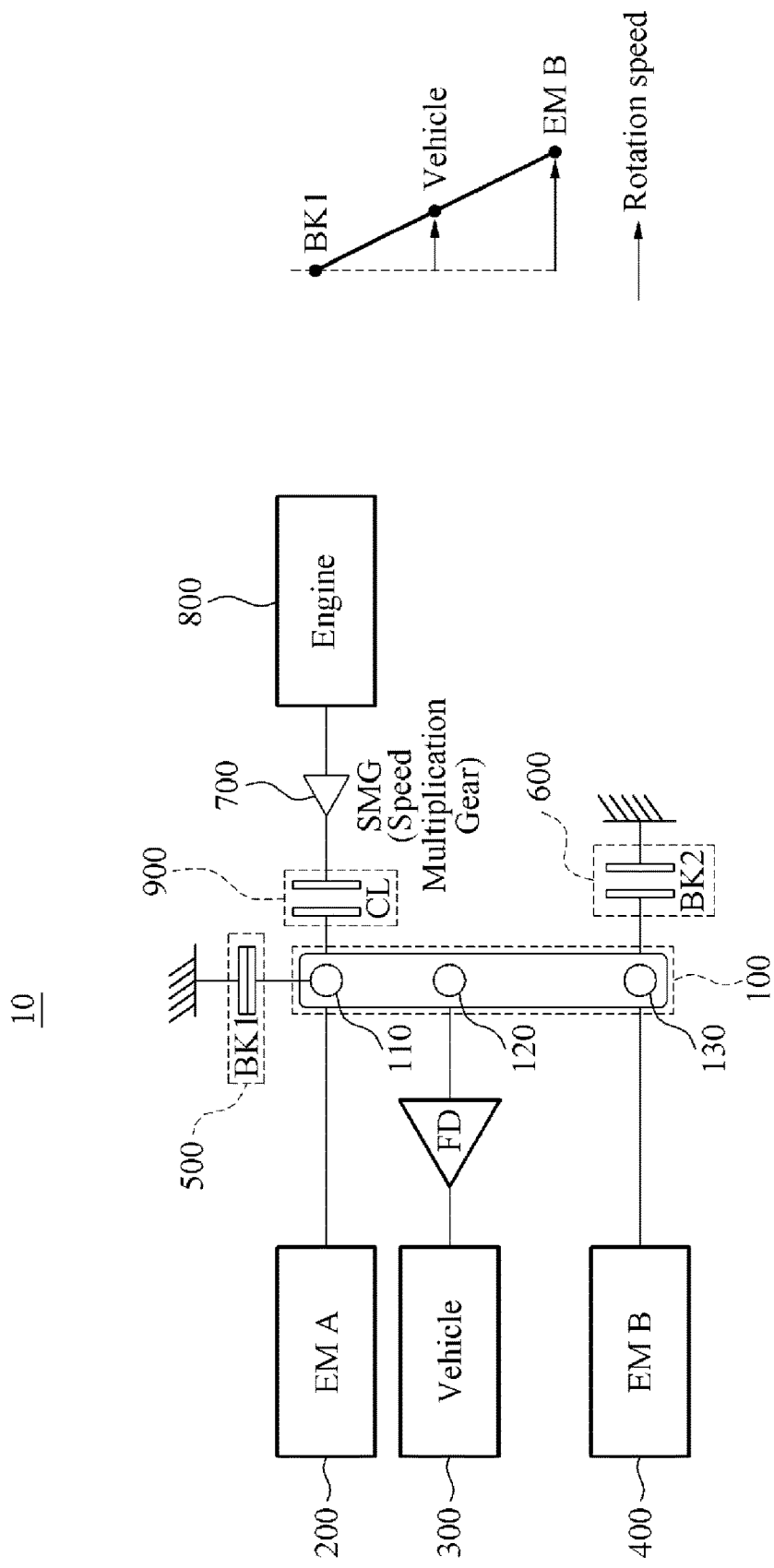
FIG. 4 illustrates an EV2 mode of the hybrid powertrain apparatus of FIG. 1.
Figure 5:
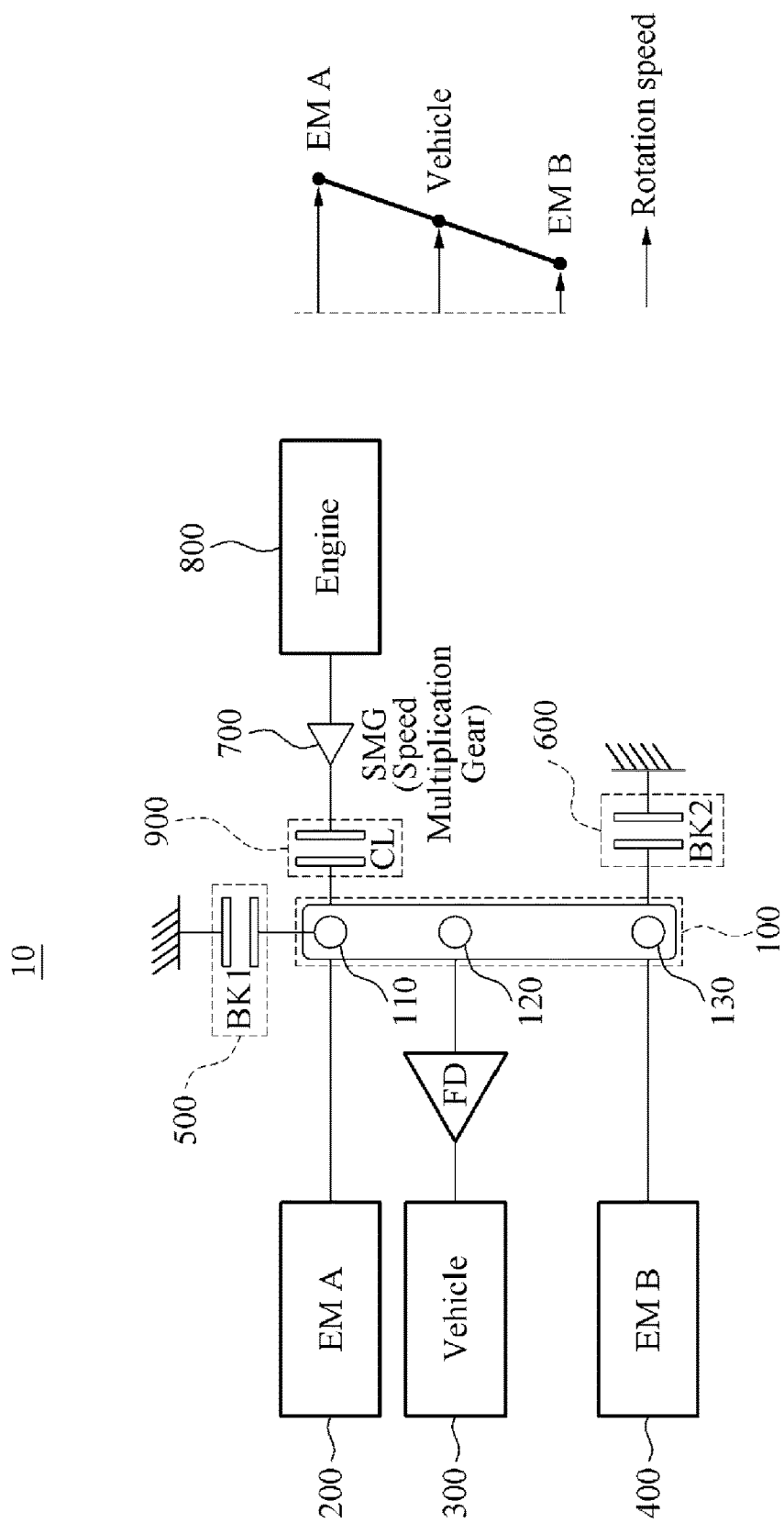
FIG. 5 illustrates an EV3 mode of the hybrid powertrain apparatus of FIG. 1.
Figure 6:
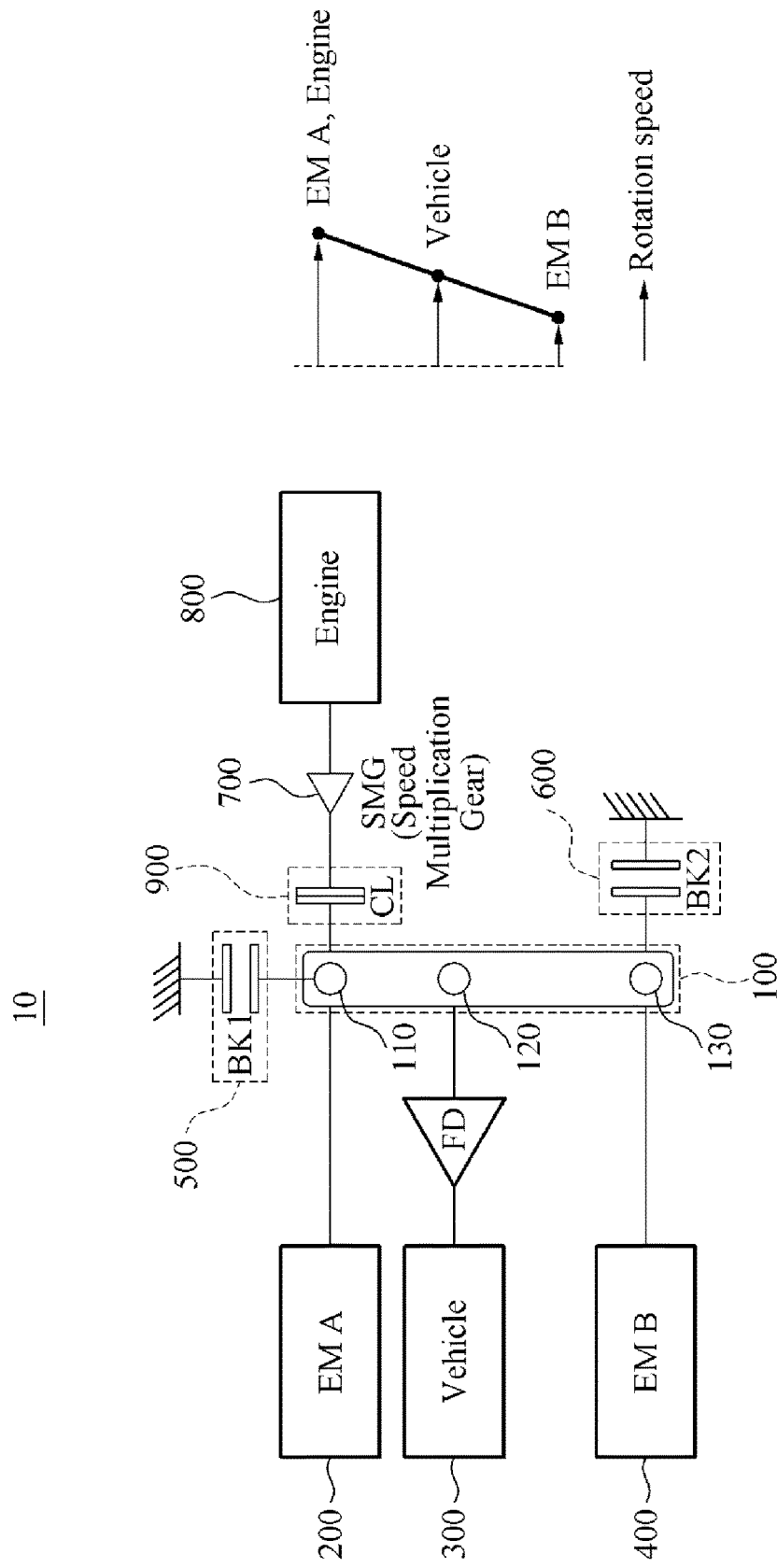
FIG. 6 illustrates a split mode of the hybrid powertrain apparatus of FIG. 1.
Figure 7:
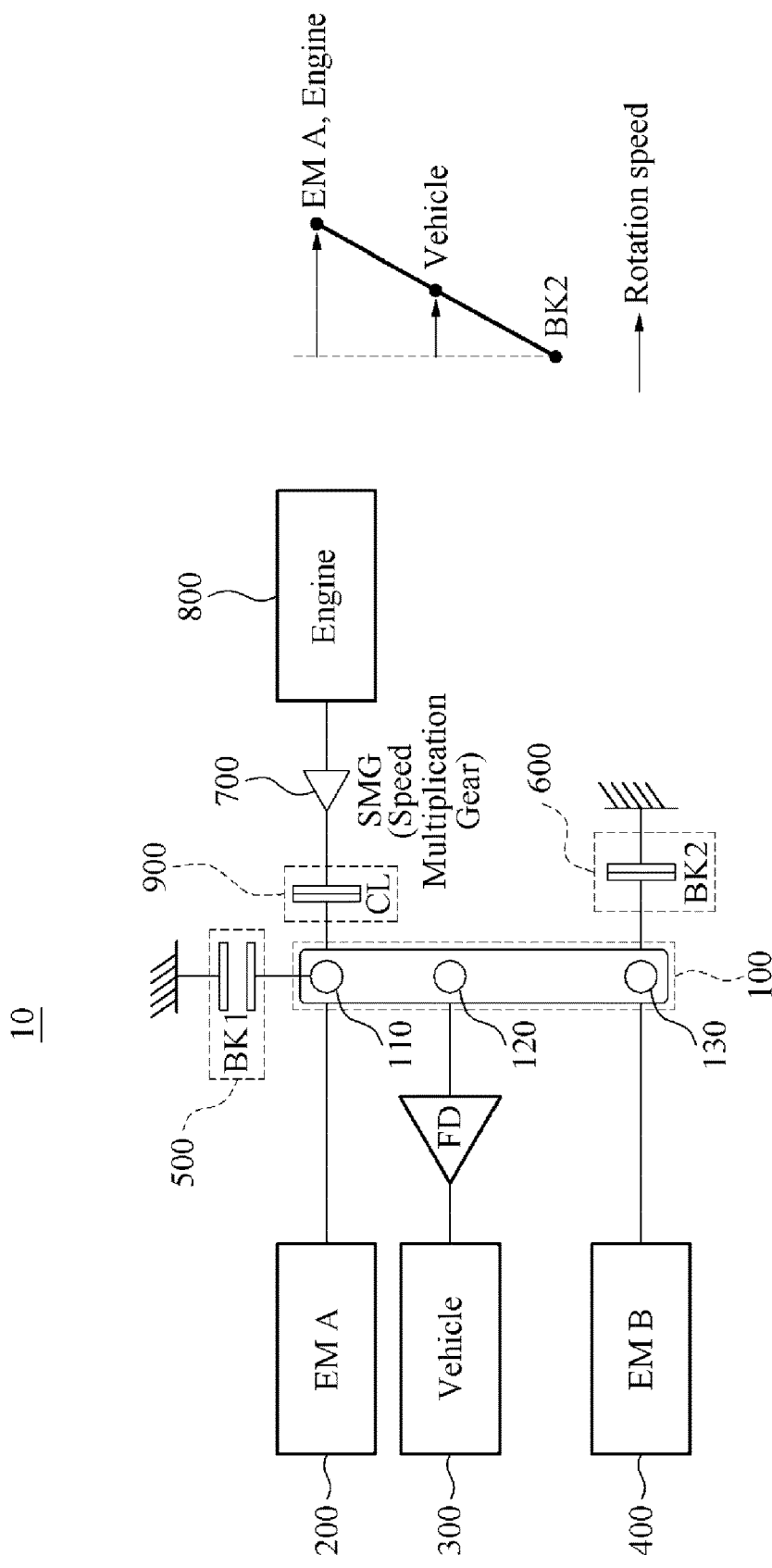
FIG. 7 illustrates a parallel mode of the hybrid powertrain apparatus of FIG. 1.
Figure 8:
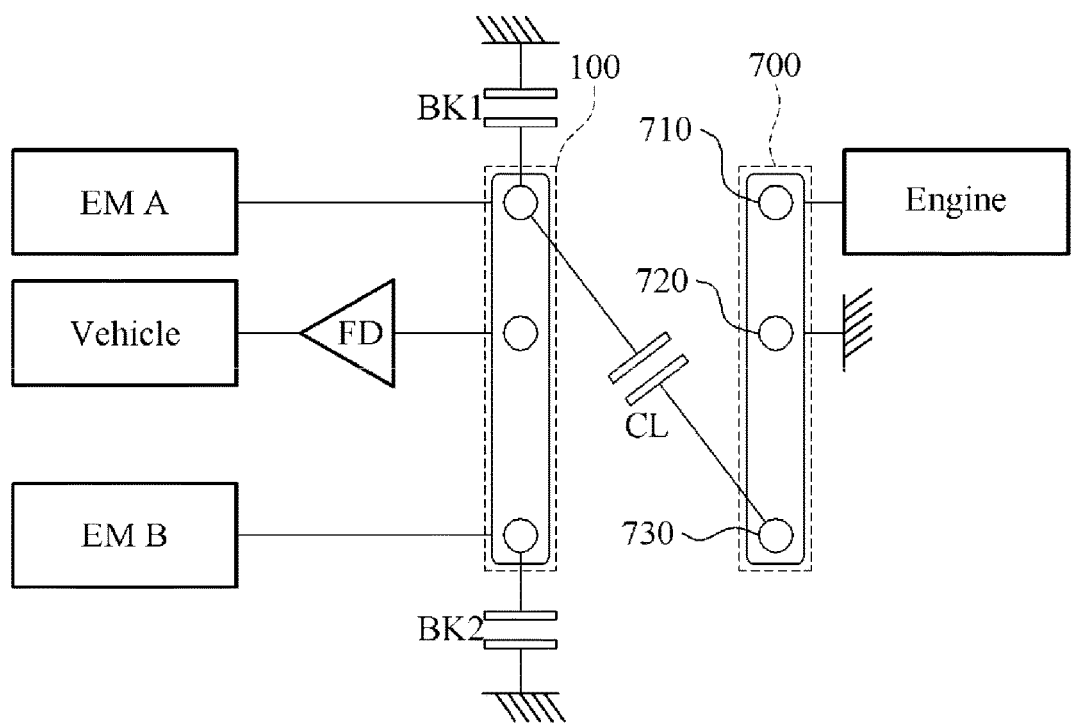
FIG. 8 illustrates a hybrid powertrain apparatus including a second planetary gear device as an SMG or a speed reduction gear (SRG).
Figure 9:
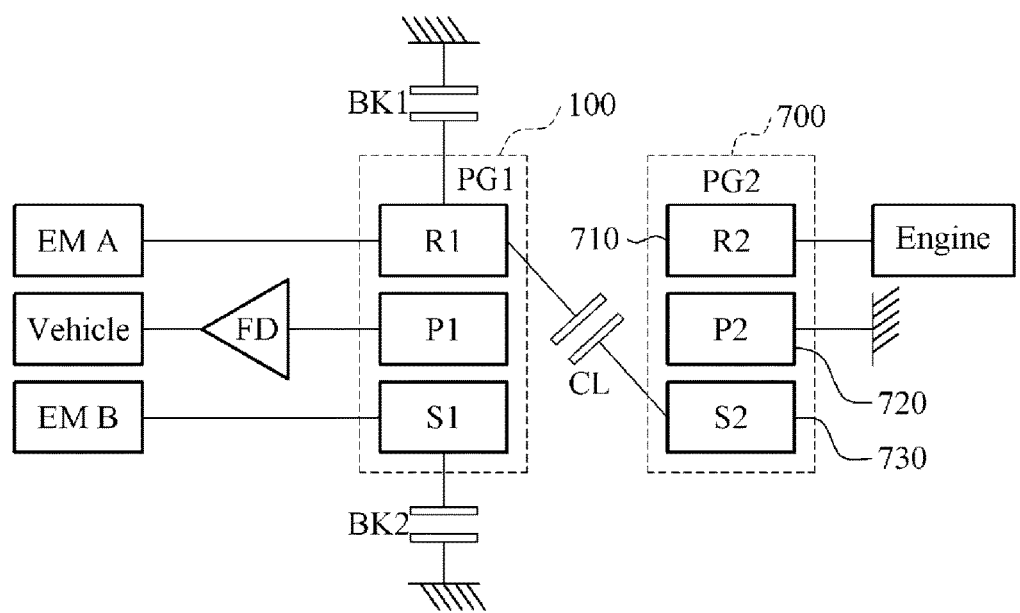
FIGS. 9 through 11 illustrate elements of the second planetary gear device of the hybrid powertrain apparatus of FIG. 8 and arrangement of the elements.
Figure 10:
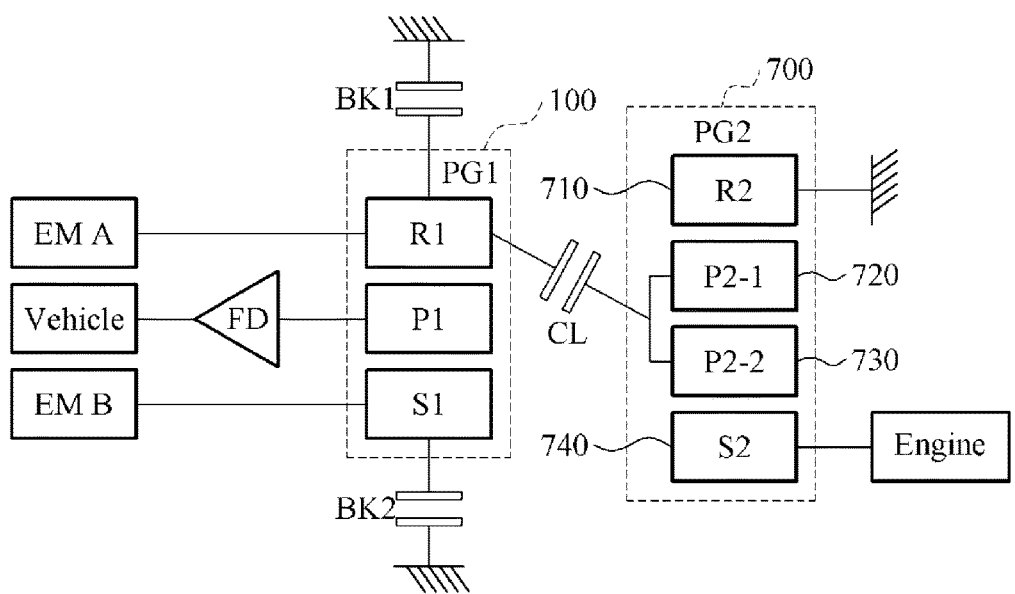
Figure 11:
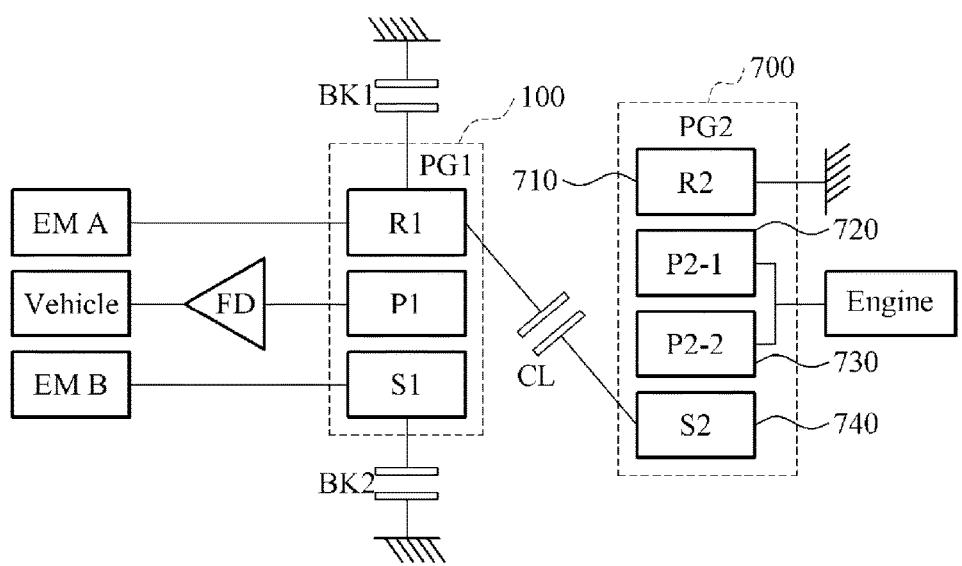
Figure 12:
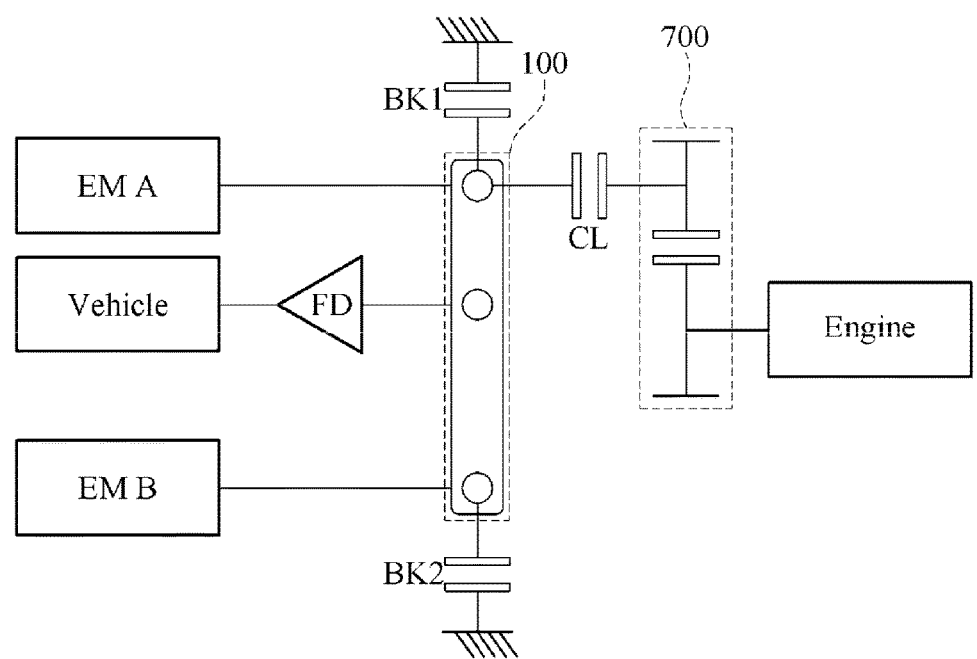
FIGS. 12 and 13 illustrate a hybrid powertrain apparatus including a parallel-axis gear as an SMG or an SRG.
Figure 13:
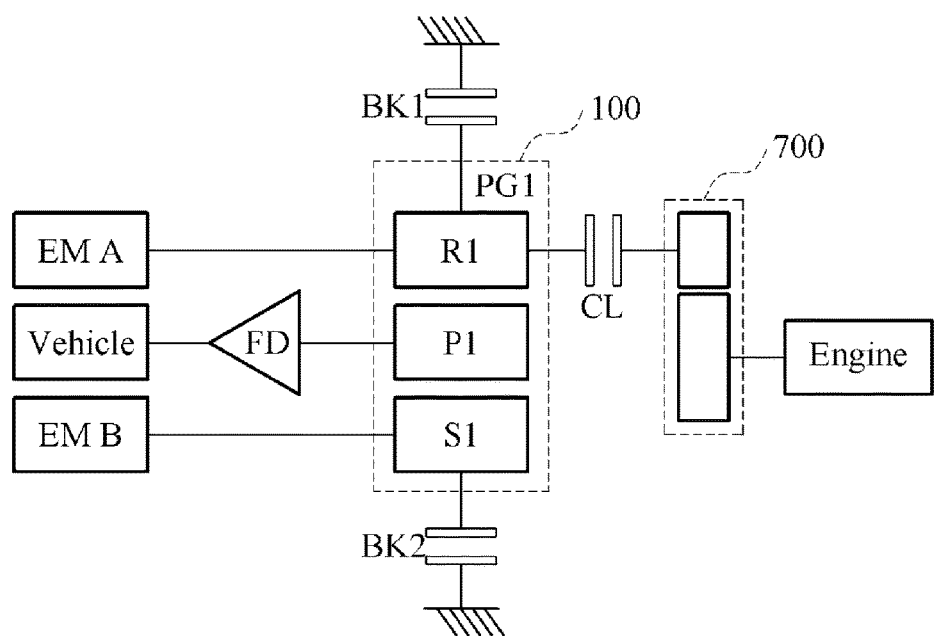
Figure 14:
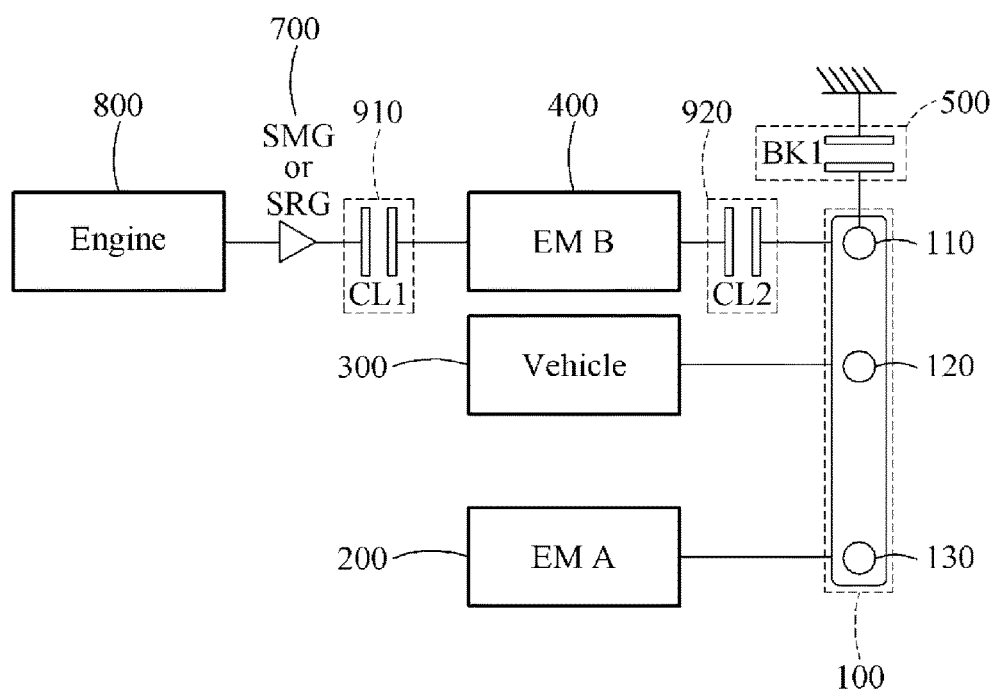
FIG. 14 illustrates a hybrid powertrain apparatus including an SMG or an SRG.
Figure 17:
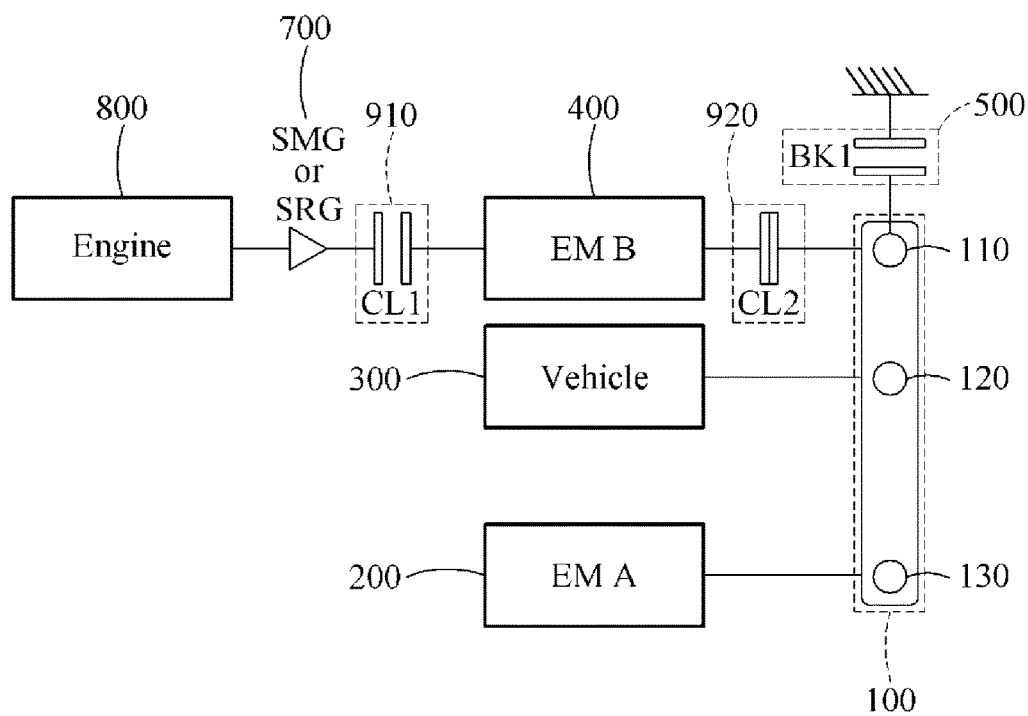
FIG. 17 illustrates an EV2 mode of the hybrid powertrain apparatus of FIG. 14.
Figure 17:
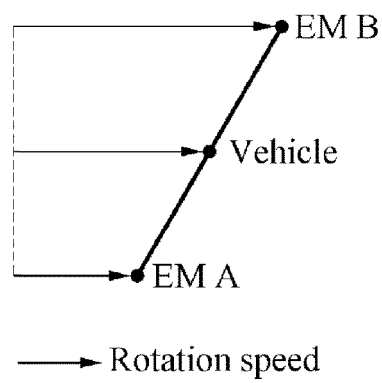
Figure 18:
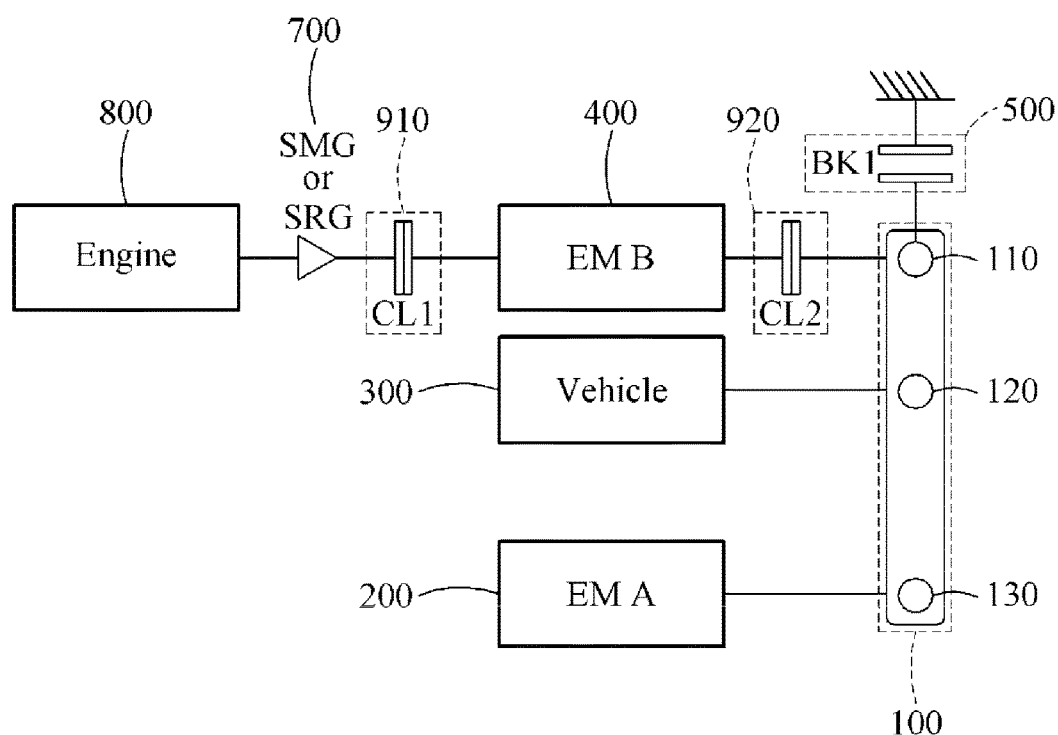
FIG. 18 illustrates a split mode of the hybrid powertrain apparatus of FIG. 14.
Figure 18:
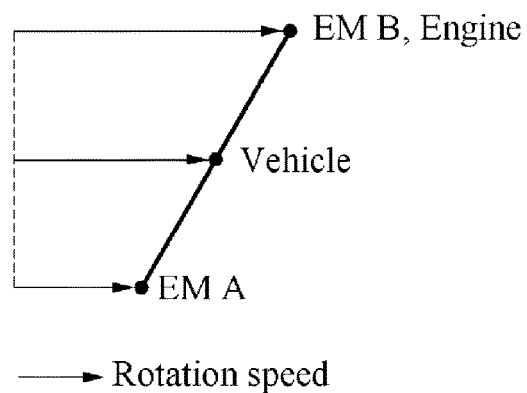
Figure 19:
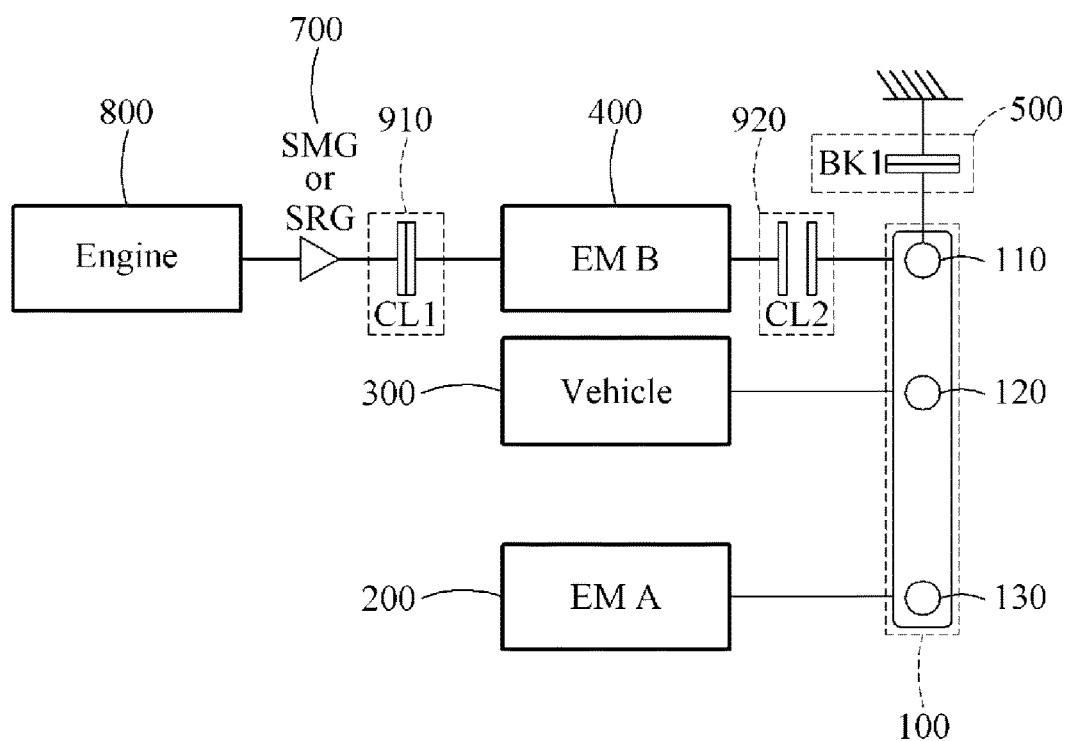
FIG. 19 illustrates a parallel mode of the hybrid powertrain apparatus of FIG. 14.
Figure 19:
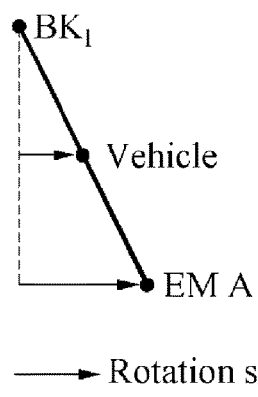
Figure 20:
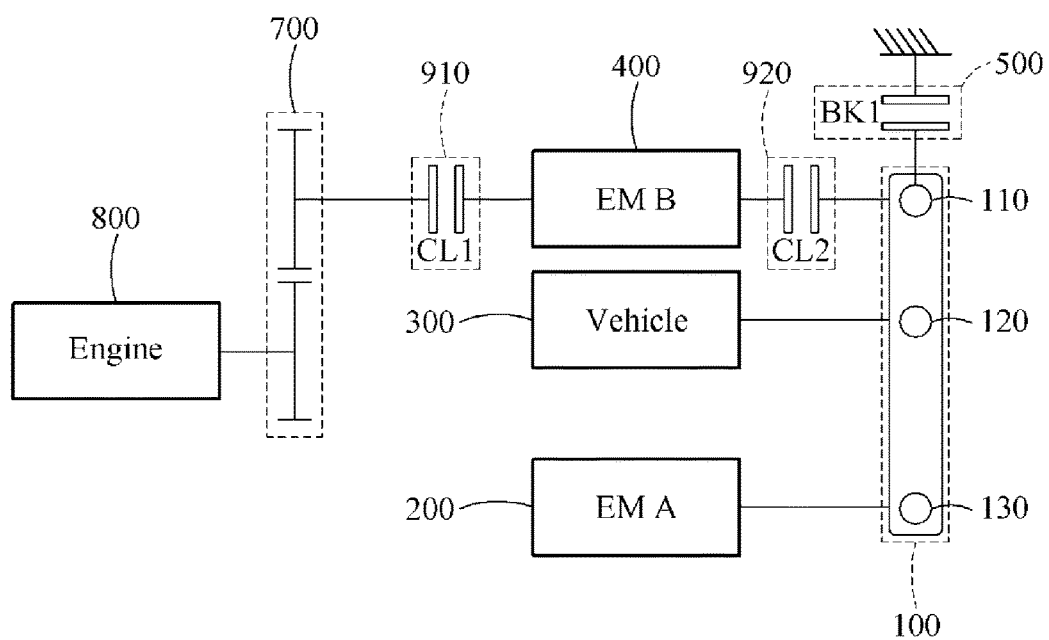
FIG. 20 illustrates a hybrid powertrain apparatus including a parallel-axis gear as an SMG or an SRG.
Figure 21:
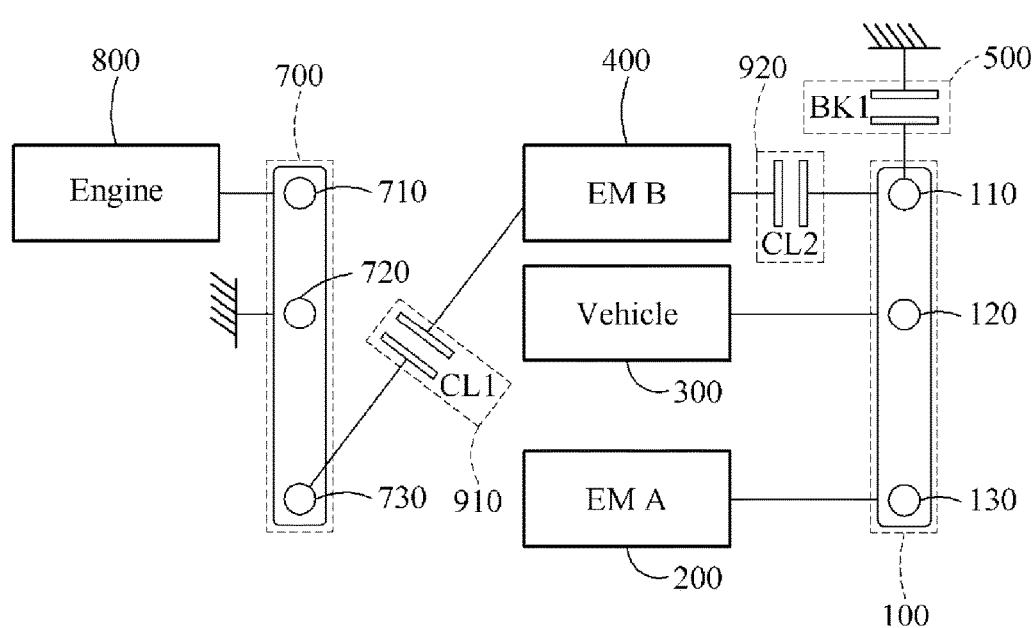
FIG. 21 illustrates a hybrid powertrain apparatus including a second planetary gear device as an SMG or an SRG.
Figure 22:
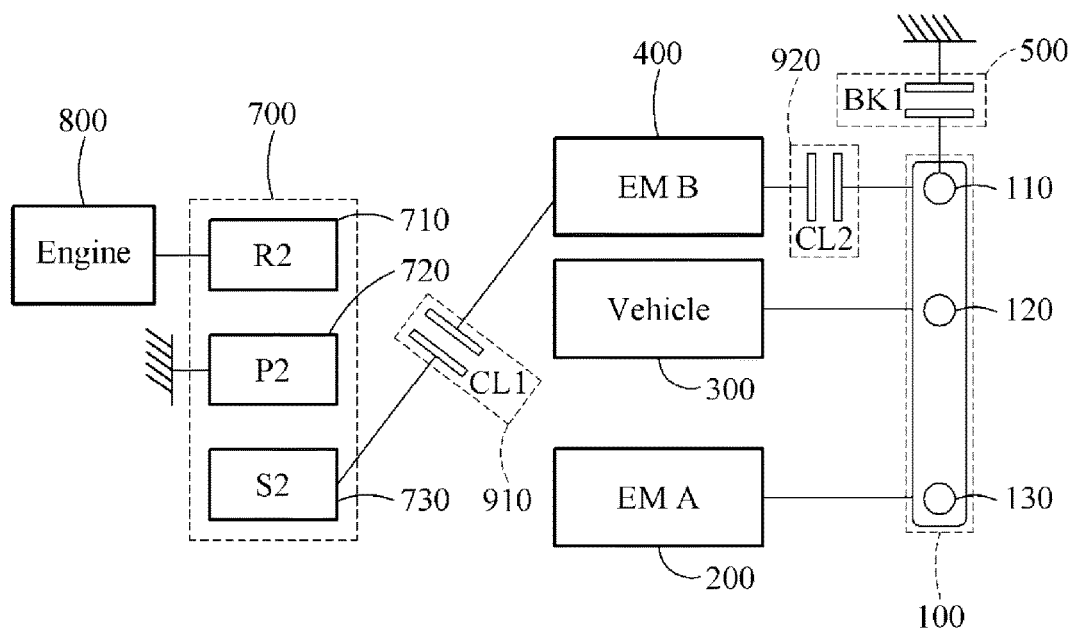
FIGS. 22 and 23 illustrate elements of the second planetary gear device of the hybrid powertrain apparatus of FIG. 21 and arrangement of the elements.
Figure 23:
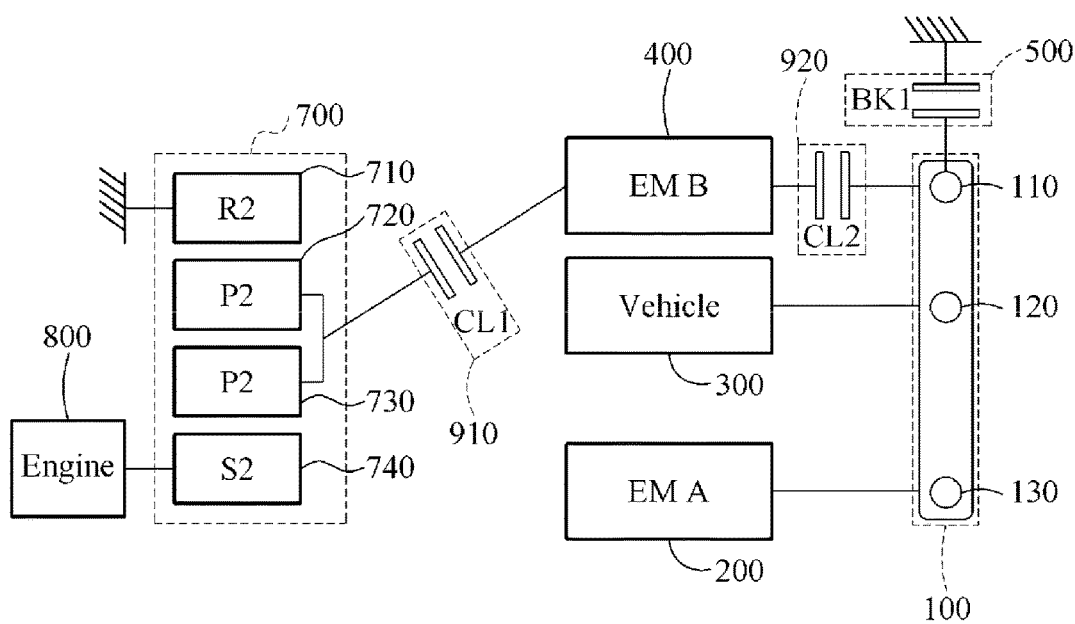

FIG. 1 illustrates a hybrid powertrain apparatus including a speed multiplication gear (SMG). FIGS. 2A and 2B illustrate operation statuses of a brake and a clutch for each mode of the hybrid powertrain apparatus of FIG. 1. FIG. 3 illustrates an electric vehicle (EV)1 mode of the hybrid powertrain apparatus of FIG. 1. FIG. 4 illustrates an EV2 mode of the hybrid powertrain apparatus of FIG. 1. FIG. 5 illustrates an EV3 mode of the hybrid powertrain apparatus of FIG. 1. FIG. 6 illustrates a split mode of the hybrid powertrain apparatus of FIG. 1. FIG. 7 illustrates a parallel mode of the hybrid powertrain apparatus of FIG. 1. FIG. 8 illustrates a hybrid powertrain apparatus including a second planetary gear device as an SMG or a speed reduction gear (SRG). FIGS. 9 through 11 illustrate elements of the second planetary gear device of the hybrid powertrain apparatus of FIG. 8 and arrangement of the elements. FIGS. 12 and 13 illustrate a hybrid powertrain apparatus including a parallel-axis gear as an SMG or an SRG. FIG. 14 illustrates a hybrid powertrain apparatus including an SMG or an SRG. FIG. 15 illustrates operation statuses of a brake and a clutch for each mode of the hybrid powertrain apparatus of FIG. 14. FIGS. 16A through 16D illustrate an EV1 mode of the hybrid powertrain apparatus of FIG. 14. FIG. 17 illustrates an EV2 mode of the hybrid powertrain apparatus of FIG. 14. FIG. 18 illustrates a split mode of the hybrid powertrain apparatus of FIG. 14. FIG. 19 illustrates a parallel mode of the hybrid powertrain apparatus of FIG. 14. FIG. 20 illustrates a hybrid powertrain apparatus including a parallel-axis gear as an SMG or an SRG. FIG. 21 illustrates a hybrid powertrain apparatus including a second planetary gear device as an SMG or an SRG. FIGS. 22 and 23 illustrate elements of the second planetary gear device of the hybrid powertrain apparatus of FIG. 21 and arrangement of the elements.

Referring to FIG. 1, a hybrid powertrain apparatus 10 may include a first planetary gear device 100 including at least three rotary elements, for example, a first rotary element 110, a second rotary element 120, and a third rotary element 130, a first motor 200, an output axis 300, and a second motor 400 connected to the first rotary element 110, the second rotary element 120, and the third rotary element 130, respectively. In this disclosure, the first motor 200, the output axis 300, and the second motor 400 may also be referred to as EM A, a vehicle, and EM B, respectively. In this example, a final drive (FD) may be provided between the second rotary element 120 of the first planetary gear device 100 and the output axis 300.

The hybrid powertrain apparatus 10 may include a first brake 500 and a second brake 600 provided to vary rotation restricting states of the first rotary element 110 and the third rotary element 130 of the first planetary gear device 100 relative to a fixing member. In this disclosure, the first brake 500 and the second brake 600 may also be referred to as BK 1 and BK 2, respectively. The hybrid powertrain apparatus 10 may include an engine 800 variably connected to the first rotary element 110 of the first planetary gear device 100. Also, the hybrid powertrain apparatus 10 may include a clutch 900 configured to variably connect the engine 800 and the first rotary element 110 of the first planetary gear device 100 so as to vary a mutual rotation restricting state between the engine 800 and the first rotary element 110.

Here, the fixing member may be, for example, a transmission gear.

The hybrid powertrain apparatus 10 may further include an SMG 700. The SMG 700 may be located between the clutch 900 and the engine 800 to connect the clutch 900 and the engine 800.

Here, the first rotary element 110, the second rotary element 120, and the third rotary element 130 of the first planetary gear device 100 may be a first ring gear R1, a first carrier C1, and a first sun gear S1. The first ring gear R1 may be connected to the first motor 200, the first brake 500, and the clutch 900. The first carrier C1 may be connected to the output axis 300. The first sun gear S1 may be connected to the second motor 400 and the second brake 600.

Hereinafter, an example of an operation status of the hybrid powertrain apparatus 10 for each mode will be described with reference to FIGS. 2A and 2B.

FIGS. 2A and 2B illustrate operation statuses of a clutch and a brake for each mode. FIG. 2A illustrates an operation mode of the hybrid powertrain apparatus 10 when the hybrid powertrain apparatus 10 includes the second brake 600 instead of the first brake 500. FIG. 2B illustrates an operation mode of the hybrid powertrain apparatus 10 when the hybrid powertrain apparatus 10 includes both the first brake 500 and the second brake 600. As such, the first brake 500 may be selectively applied depending on examples. In a case in which the first brake 500 is not provided, an operation status of the hybrid powertrain apparatus 10 in an EV2 mode may not be implemented as illustrated in FIG. 2A.

FIG. 3 illustrates an operation status of the hybrid powertrain apparatus 10 in an EV1 mode of FIGS. 2A and 2B. In an example of FIG. 3, the first motor 200 may be operative. That is, the second brake 600 may be in a connected state, and the first brake 500 and the clutch 900 may be in a disconnected state. Thus, in the EV1 mode, only the first motor 200 may be operative and a power may be supplied based on an operation of the first motor 200. In this example, a rotation speed of the output axis 300 may be greater than a rotation speed of the second brake 600 and less than a rotation speed of the first motor 200.

FIG. 4 illustrates an operation status of the hybrid powertrain apparatus 10 in an EV2 mode of FIGS. 2A and 2B. In an example of FIG. 4, the second motor 400 may be operative. That is, the first brake 500 may be in a connected state, and the second brake 600 and the clutch 900 may be in a disconnected state. Thus, in the EV2 mode, only the second motor 400 may be operative and a power may be supplied based on an operation of the second motor 400. In this example, a rotation speed of the output axis 300 may be greater than a rotation speed of the first brake 500 and less than a rotation speed of the second motor 400.

FIG. 5 illustrates an operation status of the hybrid powertrain apparatus 10 in an EV3 mode of FIGS. 2A and 2B. In an example of FIG. 5, the first motor 200 and the second motor 400 may be operative. That is, the first brake 500, the second brake 600, and the clutch 900 may be in a disconnected state. Thus, in the EV3 mode, the first motor 200 and the second motor 400 may be operative and a power may be supplied based on operations of the first motor 200 and the second motor 400. In this example, each of the output axis 300, the first motor 200, and the second motor 400 may rotate at a corresponding angular velocity satisfying a velocity relationship by a planetary gear.

FIG. 6 illustrates an operation status of the hybrid powertrain apparatus 10 in a split mode of FIGS. 2A and 2B. In an example of FIG. 6, the first motor 200, the second motor 400, and the engine 800 may be operative. That is, the clutch 900 may be in a connected state, and the first brake 500 and the second brake 600 may be in a disconnected state. Thus, in the split mode, the first motor 200, the second motor 400, and the engine 800 may be operative and a power may be supplied based on operations of the first motor 200, the second motor 400, and the engine 800. In this example, each of the first motor 200, the second motor 400, and the engine 800 may rotate at a corresponding angular velocity satisfying a velocity relationship by a planetary gear.

FIG. 7 illustrates an operation status of the hybrid powertrain apparatus 10 in a parallel mode of FIGS. 2A and 2B. In an example of FIG. 7, the first motor 200 and the engine 800 may be operative. That is, the second brake 600 and the clutch 900 may be in a connected state, and the first brake 500 may be in a disconnected state. Thus, in the parallel mode, the first motor 200 and the engine 800 may be operative and a power may be supplied based on operations of the first motor 200 and the engine 800. In this example, a rotation speed of the output axis 300 may be less than a rotation speed of the first brake 500 and a rotation speed of the engine 800, and greater than a rotation speed of the second brake 600.

FIG. 8 illustrates another example of the hybrid powertrain apparatus 10. In an example of FIG. 8, the hybrid powertrain apparatus 10 may include a first planetary gear device 100 including at least three rotary elements and a second planetary gear device 700 including at least three rotary elements and variably connected to the first planetary gear device 100, the first motor 200, the output axis 300, and the second motor 400. The first motor 200, the output axis 300, and the second motor 400 may be connected to the first rotary element 110, the second rotary element 120, and the third rotary element 130, respectively. In this example, a final drive may be provided between the second rotary element 120 of the first planetary gear device 100 and the output axis 300. The hybrid powertrain apparatus 10 may further include the first brake 500 and the second brake 600 provided to vary rotation restricting states of the first rotary element 110 and the third rotary element 130 of the first planetary gear device 100 relative to a fixing member. The hybrid powertrain apparatus 10 may include the engine 800 connected to the second planetary gear device 700.

The hybrid powertrain apparatus 10 may further include the clutch 900 configured to variably connect the first rotary element 110 and the second planetary gear device 700 of the first planetary gear device 100 so as to vary a mutual rotation restricting state between the first rotary element 110 and the second planetary gear device 700.

The second planetary gear device 700 may be used as an SMG. The second planetary gear device 700 may be used when an SMG ratio is a value other than 1. When the SMG ratio is a value of 1, an SMG such as the second planetary gear device 700 may not be required.

Hereinafter, elements of the second planetary gear device 700 in the hybrid powertrain apparatus 10 of FIG. 8 and arrangement of the elements will be described with reference to FIGS. 9 through 11.

Here, the first rotary element 110 of the first planetary gear device 100 may be the first ring gear R1, the second rotary element 120 of the first planetary gear device 100 may be a first pinion gear P1, and the third rotary element 130 of the first planetary gear device 100 may be the first sun gear S1.

Referring to FIG. 9, the second planetary gear device 700 may include three rotary elements. For example, a first rotary element 710 of the second planetary gear device 700 may be connected to the engine 800, a second rotary element 720 of the second planetary gear device 700 may be grounded, and a third rotary element 730 of the second planetary gear device 700 may be variably connected to the first rotary element 110 by the clutch 900.

In this example, the first rotary element 710 of the second planetary gear device 700 may be a second ring gear R2, the second rotary element 720 of the second planetary gear device 700 may be a second pinion gear P2, and the third rotary element 730 of the second planetary gear device 700 may be a second sun gear S2.

Referring to FIG. 10, the second planetary gear device 700 may include four rotary elements. For example, the first rotary element 710 of the second planetary gear device 700 may be grounded, a second rotary element 720 and the third rotary element 730 of the second planetary gear device 700 may be variably connected to the first rotary element 110 by the clutch 900, and a fourth rotary element 740 of the second planetary gear device 700 may be connected to the engine 800.

In this example, the first rotary element 710 of the second planetary gear device 700 may be the second ring gear R2, the second rotary element 720 and the third rotary element 730 of the second planetary gear device 700 may be second pinion gears P2-1 and P2-2, respectively. Also, the fourth rotary element 740 may be the sun gear S2.

Referring to FIG. 11, the second planetary gear device 700 may include four rotary elements. In contrast to FIG. 10, the first rotary element 710 of the second planetary gear device 700 may be grounded, and the second rotary element 720 and the third rotary element 730 of the second planetary gear device 700 may be connected to the engine 800. The fourth rotary element 740 of the second planetary gear device 700 may be variably connected to the first rotary element 110 of the first planetary gear device 100 by the clutch 900.

In this example, the first rotary element 710 of the second planetary gear device 700 may be the second ring gear R2, and the second rotary element 720 and the third rotary element 730 of the second planetary gear device 700 may be the second pinion gears P2-1 and P2-2, respectively. Also, the fourth rotary element 740 of the second planetary gear device 700 may be the second sun gear S2.

Referring to FIG. 12, when a gear ratio is a value other than 1, an additional gear may be required. In this example, a parallel-axis gear 700 may be used as an SMG or an SRG instead of a second planetary gear device.

In an example of FIG. 13, the hybrid powertrain apparatus 10 may include the first planetary gear device 100 including at least three rotary elements, the first motor 200, the output axis 300, and the second motor 400. In this example, the first motor 200, the output axis 300, and the second motor 400 may be connected to the first rotary element 110, the second rotary element 120, and the third rotary element 130 of the first planetary gear device 100, respectively. Also, an FD may be provided between the second rotary element 120 of the first planetary gear device 100 and the output axis 300.

Also, the hybrid powertrain apparatus 10 may include the first brake 500, the second brake 600, the parallel-axis gear 700, and the engine 800. The first brake 500 and the second brake 600 may be provided to vary rotation restricting state of the first rotary element 110 and the third rotary element 130 of the first planetary gear device 100 relative to a fixing member. The parallel-axis gear 700 may be variably connected to the first rotary elements 110 of the first planetary gear device 100. The engine 800 may be connected to the parallel-axis gear 700.

The hybrid powertrain apparatus 10 may further include the clutch 900 configured to variably connect the first rotary element 110 of the first planetary gear device 100 and the first parallel-axis gear 700 so as to vary a mutual rotation restricting state between the first rotary element 110 and the parallel-axis gear 700.

In this example, the first rotary element 110, the second rotary element, and the third rotary element of the first planetary gear device 100 may be the first ring gear R1, the first pinion gear P1, and the first sun gear S1, respectively.

In an example of FIG. 14, the hybrid powertrain apparatus 10 may include the first planetary gear device 100 including at least three rotary elements, the second motor 400 variably connected to the first rotary element 110 of the first planetary gear device 100, the output axis 300 and the first motor 200 connected to the second rotary element 120 and the third rotary element 130 of the first planetary gear device 100, the engine 800 variably connected to the second motor 400, and the first brake 500 provided to vary a rotation restricting state of the first rotary element 110 of the first planetary gear device 100 relative to a fixing member.

The hybrid powertrain apparatus 10 may further include a first clutch 910 and a second clutch 920. The first clutch 910 may variably connect the engine 800 and the second motor 400 to vary a mutual rotation restricting state between the engine 800 and the second motor 400. The second clutch 920 may variably connect the second motor 400 and the first rotary element 110 of the first planetary gear device 100 to vary a mutual rotation restricting state between the second motor 400 and the first rotary element 110.

Also, the hybrid powertrain apparatus 10 may further include an SRG 700 or the SMG 700 located between the first clutch 910 and the engine 800 to connect the first clutch 910 and the engine 800.

The hybrid powertrain apparatus 10 may further include the parallel-axis gear 700 located between the first clutch 910 and the engine 800 and variably connected to the engine 800. That is, the parallel-axis gear 700 may be used as an SMG or an SRG.

Hereinafter, another example of an operation status of the hybrid powertrain apparatus 10 for each mode will be described with reference to FIGS. 15 through 19.

FIG. 15 illustrates operation statuses of a clutch and a brake for each mode. For example, FIG. 15 illustrates an operation mode of the hybrid powertrain apparatus 10 when the hybrid powertrain apparatus 10 includes the first brake 500, the first clutch 910 and the second clutch 920.

FIGS. 16A through 16D illustrate an operation status of the hybrid powertrain apparatus 10 in an EV1 mode of FIG. 15. The first brake 500 may be in a connected state, and the first clutch 910 and the second clutch 920 may be in a connected state or a disconnected state selectively.

Figure 16A:
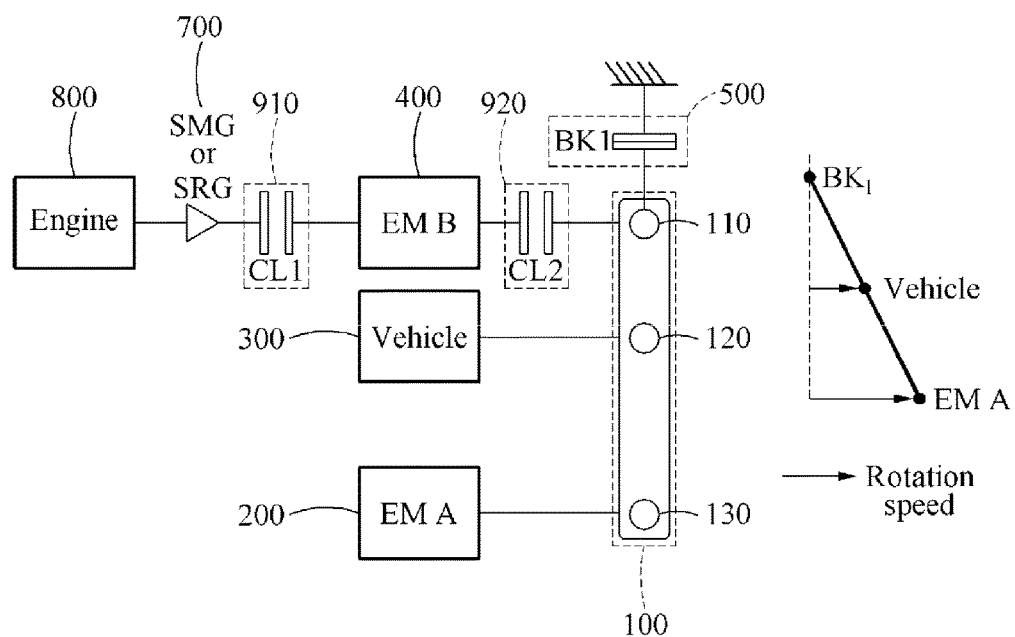
FIGS. 16A through 16D illustrate an EV1 mode of the hybrid powertrain apparatus of FIG. 14.
Figure 16B:
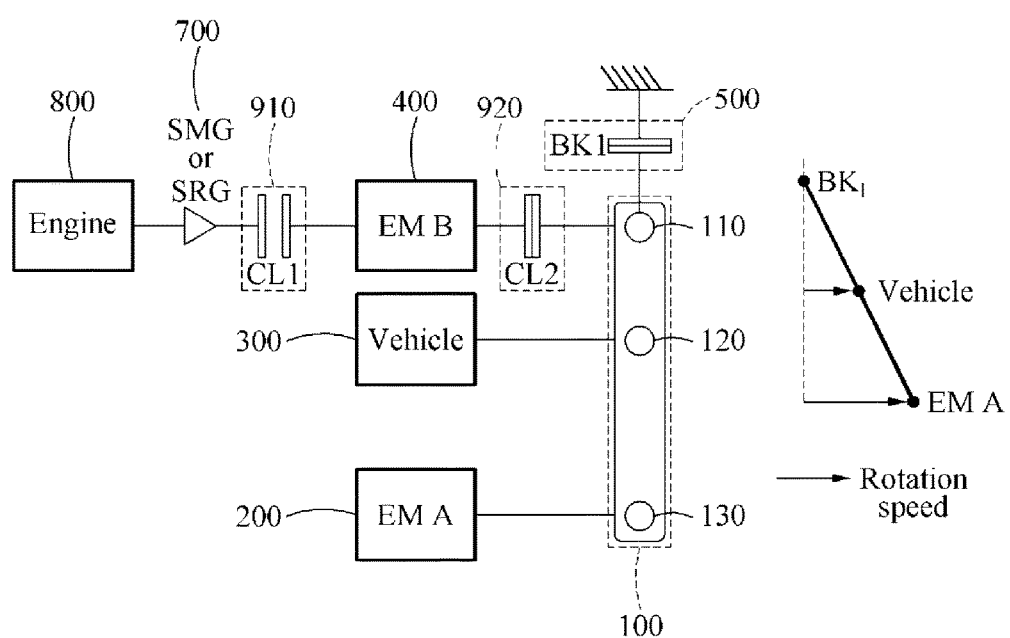
Figure 16C:
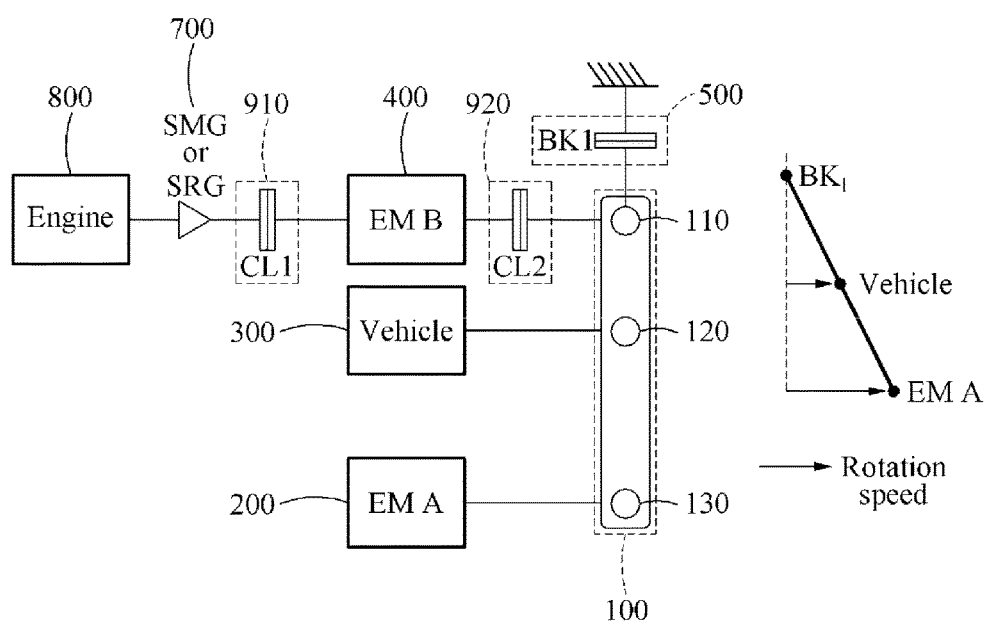
Figure 16D:
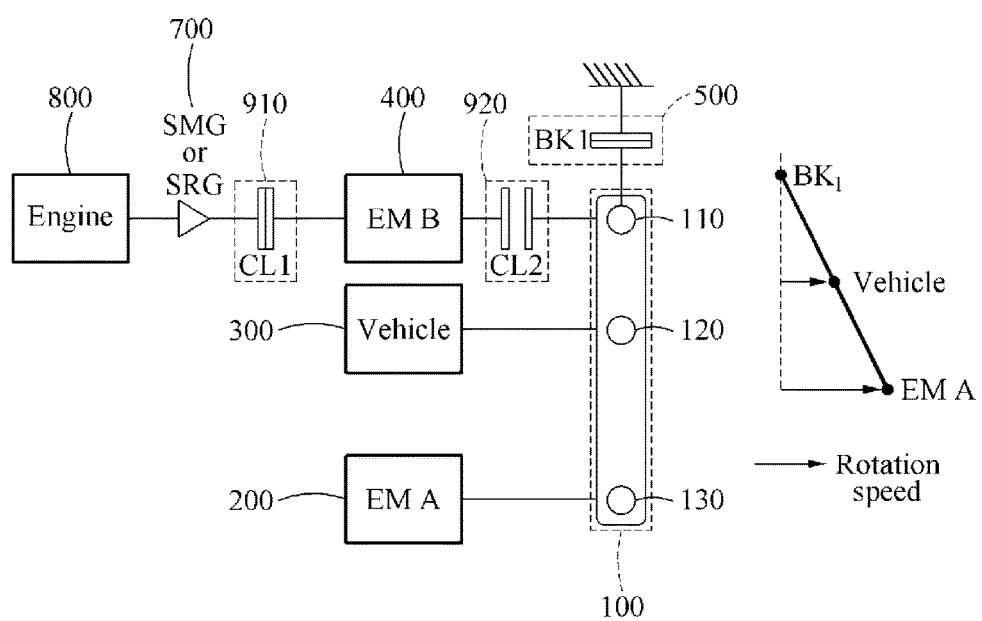

In an example of FIG. 16A, the first brake 500 may be in the connected state, and the first clutch 910 and the second clutch 920 may be in the disconnected state. In an example of FIG. 16B, the first brake 500 and the second clutch 920 may be in the connected state, and the first clutch 910 may be in the disconnected state. In an example of FIG. 16C, the first brake 500, the first clutch 910, and the second clutch 920 may be in the connected state. In an example of FIG. 16D, the first brake 500 and the first clutch 910 may be in the connected state, and the second clutch 920 may be in the disconnected state. Irrespective of a state of the second clutch 920, the first rotary element 110 may be in a stationary state and a power of the first motor 200 may be transmitted to the second rotary element 120 to be used to drive the output axis 300.

FIG. 17 illustrates an operation status of the hybrid powertrain apparatus 10 in an EV2 mode of FIG. 15. The second clutch 920 may be in a connected state, and the first clutch 910 and the first brake 500 may be in a disconnected state. In this example, a power of the second motor 400 may be transmitted to the first rotary element 110 and a power of the first motor 200 may be transmitted to the third rotary element 130. Thus, the power of the first motor 200 and the power of the second motor 400 may be transmitted to the second rotary element 120 and used to drive the output axis 300. The foregoing example is a merely an example of various operation modes of the hybrid powertrain apparatus 10 and thus, it is obvious to those skilled in the art that various change and modification are applicable thereto.

FIG. 18 illustrates an operation status of the hybrid powertrain apparatus 10 in a split mode of FIG. 15. The first clutch 910 and the second clutch 920 may be in a connected state, and the first brake 500 may be in a disconnected state. In this example, a power of the engine 800 may be added to a power of the second motor 400 via an SMG or an SRG, and the power of the engine 800 and the power of the second motor 400 may be transmitted to the first rotary element 110. Also, a power of the first motor 200 may be transmitted to the third rotary element 130. Thus, the power of the first motor 200, the power of the second motor 400, and the power of the engine 800 may be transmitted to the second rotary element 120 and used to drive the output axis 300. The foregoing example is a merely an example of various operation modes of the hybrid powertrain apparatus 10 and thus, it is obvious to those skilled in the art that various change and modification are applicable thereto.

FIG. 19 illustrates an operation status of the hybrid powertrain apparatus 10 in a series mode of FIG. 15. The first clutch 910 and the first brake 500 may be in a connected state, and the second clutch 920 may be in a disconnected state. In this example, a mechanical power of the engine 800 may be converted into an electric power through the second motor 400. Also, the first rotary element 110 may be in a stationary state, and a power of the first motor 200 may be transmitted to the third rotary element 130. Thus, the power of the first motor 200 may be transmitted to the second rotary element 120 and used to drive the output axis 300. In terms of the serial mode, an engine may be driven at an optimal efficiency point, a battery may be consistently charged and thus, a relatively high efficiency may be achieved. As such, the serial mode may be a mode that assists a continuous use of a high efficiency electric vehicle mode in a low speed interval.

Referring to FIG. 20, the parallel-axis gear 700 may be located between the first clutch 910 and the engine 800 and variably connected to the engine 800. In this example, the parallel-axis gear 700 may be used as an SMG or an SRG.

However, embodiments are not limited thereto. As described with reference to FIGS. 8 through 11, the hybrid powertrain apparatus 10 may also use a second planetary gear device as the SRG or SMG 700.

Referring to FIG. 21, for example, a second planetary gear device 700 may include three rotary elements. A first rotary element 710 of the second planetary gear device 700 may be connected to an engine. A second rotary element 720 of the second planetary gear device 700 may be grounded. A third rotary element 730 of the second planetary gear device 700 may be variably connected to a second motor 400 by a clutch.

Referring to FIG. 22, the first rotary element 710 may be a second ring gear R2, the second rotary element 720 may be a second pinion gear P2, and the third rotary element 730 may be a second sun gear S2.

Referring to FIG. 23, the second planetary gear device 700 may include four rotary elements. The first rotary element 710 of the second planetary gear device 700 may be grounded. The second rotary element 720 and the third rotary element 730 of the second planetary gear device 700 may be variably connected to the second motor by the clutch. A fourth rotary element 740 of the second planetary gear device 700 may be connected to the engine.

In this example, the first rotary element 710 may be the second ring gear R2, the second rotary element 720 and the third rotary element 730 may be the second pinion gears P2, respectively. Also, the fourth rotary element 740 may be the second sun gear S2.

Also, the second planetary gear device may include four rotary elements. In contrast to the aforementioned example, the first rotary element may be grounded, and the second rotary element and the third rotary element may be connected to the engine. Thus, the fourth rotary element may be variably connected to the second motor by the clutch.

In this example, the first rotary element may be the second ring gear, and the second rotary element and the third rotary element may be the second pinion gears, respectively. Also, the fourth rotary element may be the second sun gear.

According to the foregoing examples related to the hybrid powertrain apparatus 10, it is possible to arrange and connect an engine and two motors at an optimal position in a power-split hybrid vehicle, thereby realizing high fuel efficiency and acceleration performance.

Also, it is possible to implement a hybrid mode and an electric vehicle mode using a relatively simple and few elements, thereby increasing a fuel efficiency of a vehicle in a relatively large interval.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Therefore, the scope of the disclosure is defined not by the detailed description, but by the claims and their equivalents, and all variations within the scope of the claims and their equivalents are to be construed as being included in the disclosure.

The invention claimed is:

1. A hybrid powertrain apparatus comprising:
   a first planetary gear device including at least three rotary elements;
   a second motor variably connected to a first rotary element of the first planetary gear device;
   an output axis and a first motor connected to a second rotary element and a third rotary element of the first planetary gear device, respectively;
   an engine variably connected to the second motor;
   a first brake provided to vary a rotation restricting state of the first rotary element relative to a fixing member; and
   a speed multiplication gear or a speed reduction gear, which is disposed between the engine and the second motor, connects the engine and the second motor.

2. The hybrid powertrain apparatus of claim 1, further comprising:
   a first clutch configured to variably connect the engine and the second motor so as to vary a mutual rotation restricting state between the engine and the second motor; and
   a second clutch configured to variably connect the second motor and the first rotary element so as to vary a mutual rotation restricting state between the second motor and the first rotary element.

3. The hybrid powertrain apparatus of claim 1, wherein the speed multiplication gear or a speed reduction gear is a parallel-axis gear.

4. The hybrid powertrain apparatus of claim 1, wherein the speed multiplication gear or a speed reduction gear is a second planetary gear device including at least three rotary elements.

5. The hybrid powertrain apparatus of claim 4, wherein a first rotary element of the second planetary gear device is connected to the engine,
   a second rotary element of the second planetary gear device is grounded, and
   a third rotary element of the second planetary gear device is variably connected to the second motor by the first clutch.

6. The hybrid powertrain apparatus of claim 5, wherein the first rotary element, the second rotary element, and the third rotary element of the second planetary gear device are respectively a ring gear, a pinion gear, and a sun gear.

7. The hybrid powertrain apparatus of claim 4, wherein a first rotary element of the second planetary gear device is grounded,
   a second rotary element and a third rotary element of the second planetary gear device are variably connected to the second motor by the first clutch, and
   a fourth rotary element of the second planetary gear device is connected to the engine.

8. The hybrid powertrain apparatus of claim 7, wherein the first rotary element, the second rotary element, and the third rotary element of the second planetary gear device are respectively a ring gear, a pinion gear, a pinion gear and a sun gear.

* * * * *